(12) United States Patent
Hertsgaard (10) Patent No.: US 11,836,680 B1
(45) Date of Patent: Dec. 5, 2023

(54) SYSTEM AND METHOD FOR INTERACTIVE LEARNING

(71) Applicant: Peter Hertsgaard, Charlottesville, VA (US)

(72) Inventor: Peter Hertsgaard, Charlottesville, VA (US)

(*) Notice: Subject to any disclaimer, the term of this patent is extended or adjusted under 35 U.S.C. 154(b) by 0 days.

(21) Appl. No.: 18/088,882

(22) Filed: Dec. 27, 2022

(51) Int. Cl.
| | | |
|---|---|---|
| *G06Q 10/10* | (2023.01) | |
| *G06Q 10/06* | (2023.01) | |
| *G06Q 30/06* | (2023.01) | |
| *G06Q 30/04* | (2012.01) | |
| *G06Q 10/101* | (2023.01) | |

(52) U.S. Cl.
CPC .................. *G06Q 10/101* (2013.01)

(58) Field of Classification Search
CPC .................................... G06Q 10/101
USPC ......................... 705/300, 1.1–912
See application file for complete search history.

(56) References Cited

U.S. PATENT DOCUMENTS

| | | | | |
|---|---|---|---|---|
| 9,626,875 | B2* | 4/2017 | Gal .................... | G09B 5/08 |
| 11,406,896 | B1* | 8/2022 | Cheung ............. | G06V 40/20 |
| 2019/0138923 | A1* | 5/2019 | Jacobs ................ | G06F 40/30 |
| 2019/0304157 | A1* | 10/2019 | Amer .................. | G06V 40/23 |
| 2020/0074878 | A1* | 3/2020 | Hertsgaard ......... | G09B 19/00 |
| 2021/0165481 | A1* | 6/2021 | Brugarolas Brufau .................. G06T 15/00 |

* cited by examiner

*Primary Examiner* — Jonathan P Ouellette (74) *Attorney, Agent, or Firm* — Colson Law Group, PLLC (57) ABSTRACT

A system for interactive learning has a database of content, the content including spatial, temporal, material, psychological, moral, artistic, philosophical, scientific, and probability elements from which to create a story track. At least one software program is disposed on at least one computer system designed to calculate story vectors from which to craft stories and select learning objectives. A learning management system with at least one user interface is designed to allow at least one or more people to, via at least one or more of video, audio, and text, interact with at least one or more of the software program and people, people inclusive of audience members, characters, actors, clients, and moderators. The software program is designed to direct the story within degrees of freedom calculated from the story vectors to create new story vectors, the story vectors used to create one or more new story tracks.

17 Claims, 8 Drawing Sheets

SYSTEM AND METHOD FOR INTERACTIVE LEARNING

FIELD OF THE INVENTION

The inventive concept relates generally to a system and method for interactive learning.

BACKGROUND

In arranged group events, storytellers may intend for plot developments to follow traditional narrative forms and models. Predetermined story plots and characterizations may present contrived situations and dramatic conflict, where the combination of aesthetic and learning knowledge elements, themes and issues aggregate to form a pre-selected story.

In this storytelling setting, listeners may function not only as 'receptive' audience members, but as 'participative' agents charged with considering and evaluating several plot and character developments (including story endings) as the most compelling from which to achieve learning, knowledge, understanding and insight for given dynamic situations. This interactive 'participative' storytelling approach is evidenced in book club settings.

Individuals engaging in a storytelling event may also function in a 'co-creative' mode by choosing to improvise alterations to the already-created story elements of setting, background, themes, imagery, ideas, narrative forms and models, plot structure and developments and character definition and developments. A current, popular example of this innovative storytelling model is the "fan fiction" phenomenon, wherein individuals, or groups, begin with certain characters, plots, or created worlds from completed stories, etc. and then make revisions, expansions, limitations, combinations, deletions, etc. to story elements. This innovative approach to storytelling is also witnessed in classrooms, where students may engage in improvised alterations to given story elements.

In storytelling experiences, there are or may be ongoing thresholds of decision-making wherein the choices of creative alterations to the story are executed. In this process, a 'moderator' function, if even informally manifested, is usually involved, thus providing, with collaborative input from participants, defined parameters, protocols, and processes to utilize in this innovative storytelling event. At these threshold points of creative decision-making, the moderator, and participants, whether in an individual or group mode, make choices known by voice vote, a show of hands, or other means for the storytelling task at hand. These thresholds of decision-making, also definable as key control points, may also involve a more robust, penetrating, and interactive discussion, evaluation, and assessment of a hierarchy of aesthetic and learning knowledge choices related to plot and character and narrative forms and models' definition and development, as well as exploration of various thematic, setting, background, and effectiveness of story mode or platform expression and delivery elements.

Whether applied to already-completed stories, to modified stories, or even to stories, which are improvised from scratch, the potential aesthetic and learning knowledge creative choices made by participants in a storytelling event would be limitless, considering the profound possibilities, dimensions, and mysteries of the imagination and human psyche. Thus, even with the utilization of a moderator in this process, the daunting realization would arise that combinations and re-combinations of story elements could be endlessly explored, unless some overriding principle, approach, model, etc. is in place through which to 'filter' the decision-making thresholds' (key control points) process.

Along with the array of potential choices in each of the storytelling contexts outlined above, another possibly more significant challenge is the individual and collective biases that would manifest within, between, and among participants in the storytelling event, including subjective perceptions and assessments of the intentions and vision of the original story creator. Thus, again, besides some 'rules of engagement' which defined the parameters of consideration and choice within the storytelling event, there would be a parallel need to have an authentic, connected "interactive space" of transparency, self-awareness, awareness of others, wise and effective management of these dynamics when expressed/debriefed, and good will to be established, maintained, and evolved.

Furthermore, if these innovative storytelling events transcend the verbal, written, or visual modes to a live performance mode (i.e., 'live theater') all the identified intentions, processes, and challenges would still be in play. In fact, it's likely that greater challenges would be revealed in this 'theatrical' versioning of stories—the visceral and surprising discovery of an unending number of limited, nonsensical, ill-considered, stereotypical, boring, flat, etc., characterizations and consequently unbelievable plot developments.

Thus, again, we see the absolute and requisite need for a nuanced, collaborative, and balanced 'learning entertainment' resource, comprised of personnel with outstanding aesthetic and learning knowledge sets and capabilities (mindfully and humanely expressed) if we are to create an interactive storytelling event that satisfies the inner desire within participants for truth whether filtered through traditional or alternative (or mixtures of both) narrative forms and models, a recognition by participants that the aesthetic and learning knowledge story elements presented are truthful; a truth that, in part, is created by participants—audience members, moderators, actors, characters, etc.—through their presence and contributions in interactive interludes wherein time within the story is frozen, so that new aesthetic and learning knowledge choices could be made, and perhaps (for an elevated evolution of self and others) then improvised by themselves, or by actors portraying characters in the story audience member-participants are viewing.

In arranged group events, storytellers may intend for character and plot developments to follow traditional narrative forms and models. Combined story elements and issues can form a pre-selected story wherein the participants are to be versed to evaluate and consider many choices regarding definitions and developments of character, plot, imagery, themes, narrative forms, narrative models, ideas, beliefs and values, the most compelling ending from which to gain learning, knowledge, insight, and understanding.

Predetermined story elements—plot, character, imagery, setting, background, themes, ideas, narrative forms and models, beliefs, and values—can present contrived scenarios which limit the potential interactive influencing of story elements by participants in storytelling events. Alternatively, the definitions and developments of narrative forms and models, character, plot, imagery, setting, background, themes, ideas, beliefs, and values story elements can be selected by storytelling participants. But there is a need in the market for a method, process and system that allows participants in storytelling events in real-time to influence how story elements develop, evolve, and even transform, from beginning to end (as well as other, alternative plot evolution models, including non-linear, or omni-directional)

including their final ending(s) while simultaneously controlling the degree to which influence is permitted.

SUMMARY OF THE INVENTION

Disclosed is a system and method for interactive learning having a database of content, the content including spatial, temporal, material, psychological, moral, artistic, philosophical, scientific, and probability elements from which to create a story track, the story track including such elements as a plot, narrative, character, setting, background, and theme. The story track may appear as a live, interactive, and communal experience in which audience members, actors, characters, and moderators—where moderator also can mean facilitator—connect, collaborate, share, explore, discuss, disagree, and choose to make potentially transformative alterations to the behaviors, beliefs, and values of characters, as well as alterations to plot, setting, background, and narrative story forms and models elements presented in an interactive storytelling event.

Elements include a physical environment in which a story takes place, objects— animate and inanimate—within the physical environments, and psychological and moral parameters through which a story takes place. These elements are measurable elements. For example, the space that represents a room can be measured in three-dimensional space. Psychological characteristics of people can be measured using psychological tests and evaluations of past actions. These elements allow a software algorithm to treat such measurements as a score or assessment from which to set characteristics of people, places, and things incorporated into a story.

Notwithstanding the physical and psychological parameters present in the interactive storytelling event, there are also other essential elements and parameters therein that can be defined, measured, and incorporated into a story. These other elements include aesthetic elements related to the understanding of how creative forms and models are defined and expressed and philosophical elements which span the fundamental human considerations of beliefs, values, and ideas which are integral to the holistic learning knowledge process implicit in the interactive storytelling event. This roster of elements and their parameters also infer the presence, intertwined with the physical and psychological 'spaces', of a tangible "inner space" of emotional, mental, and spiritual presence and interaction, however subtle.

When choices by participants emerge for alterations to story elements, the aesthetic and learning knowledge basis and purpose of said choices can be acclaimed by a voice vote, show of hands, or other means, including digital virtual platforms, for the aesthetic and learning knowledge issues at hand. To gain new awareness, understanding, insight, and knowledge from the pre-selected story, there can be places in the story where a decision point organically arises (also defined as a Key Control Point) in which a moderator would pause or freeze the story, and then interact with the participants to discuss various aesthetic and learning knowledge issues regarding plot, character, imagery, ideas, settings, backgrounds, themes, beliefs, values, and definitions and developments of narrative forms and models towards the goal of making new aesthetic and learning knowledge choices as applied to the story and story elements at hand. Choices can then be explored and expressed through role play, written, aural, digital, or visual means (or through other modes of creative expression) by one or more participant constituencies (audience members, moderators, actors, characters, designers, writers, etc.) with the goal of eventually choosing the most compelling—in terms of aesthetic and learning knowledge narrative options, forms and models—creative alterations to elements of the original, finished story.

The moderator manages Key Control Points as an interactive opportunity to select creative alterations to story elements. Such moments can be designated as points of decision, where story elements, altered or not, can proceed or evolve in any of several ways toward the next Key Control Point which may include an ending of the storytelling event, or which may also extend beyond the original storytelling event to other storytelling events and their respective stories, story forms, platforms, systems, and modes of operation.

Within the said storytelling event, actors, and the characters that they portray can interact with audience members towards the goal of performing different behavioral choices as directed by audience members and other people participating in some form. These new choices, performed by the actors, would alter one or more story elements of the original story. Also, it may occur that audience members become 'actors' in this Key Control Point dramatic interlude, such that they would role play with the actors. Key Control Points would thus be characterized by and operate with dynamic, sophisticated, self-organizing and open-sourced features for arranged group storytelling events. The Key Control Points would be points of decision in the plot of a story where a variety of different story element alterations can be decided upon and implemented. Stories would have logical places to be interrupted to discuss how to proceed towards selecting and exploring new plot and character choices.

Where several possible new choices accrue, a moderator may help aid audience members, actors and characters refine and prioritize the relative value of these choices. Within the arranged group storytelling event Key Control Point interludes, audience members interact and discuss with the moderator (and may also interact and discuss with actors, characters, and other audience members, their best selections for new expressions of various character and plot developments, as filtered through the aesthetic and learning knowledge models, paradigms, principles, approaches, etc. as processed through the moderator's educational guidance.) Of the several, even many, possibilities that can be chosen, the moderator or other participants may select one or more possibilities for audience member, actor, and character participants. Audience members choose one possibility by voice acclamation, a show of hands or other means (including digital virtual platforms) as the best selection for the story element alteration at hand. Other possibilities may occur besides the "best selection" option and may also be chosen by audience members, the moderator, actors, and characters, and then performed, whether by actors or audience members. Such a dynamic, nuanced, and evolving process, however, still depends on a moderator to guide, monitor, influence and control it, as such a process would likely be subject toward bias. Moderators may have preconceived notions of altered plot and character definitions and developments that would deliver a desired, biased result.

The inventive concept includes at least one software program disposed on at least one computer system designed to calculate story vectors from which to craft a story and a learning objective. Some vectors, such as the space in a room or a personality characteristic, may be constants. Other vectors, such as the share of an object received from a negotiation or the perception of whether and act is moral, may be variable. Variable vectors further allow the software program to determine the direction of the story and how well story elements are aligned or adaptable to alterations.

The inventive concept includes a learning management system with at least one user interface designed to at least one or more of present the story, present test questions pertaining to the story, and allow at least one or more people to, via at least one or more of video, audio, and text, interact with at least one or more of the software program and people, the people including at least one or more of audience members, characters, actors, clients, moderators, and other constituencies, the actors which are at least one or more of people or computer-generated avatars. The learning management system is designed to receive inputs and present outputs and may be designed to use calculations made at least one or more of on the learning management system, a learning management system controller and memory therein, the learning management system controller and memory which may be the learning management system controller and memory of a smartphone or other handheld devices or other computer interface solutions such as personal computers.

The inventive concept includes at least one authorization gate designed to regulate how at least one person can direct at least one parameter of the story in real-time and to what extent, the software program designed to direct the story within degrees of freedom calculated from the story vectors to create new story vectors, the story vectors used to create one or more story tracks. The gate allows the at least one person to change parameters of a given story. For illustration, the gate at one point in time may allow only a moderator to change the parameter of the story. At another point in time, the gate may allow other participants to change the parameter of the story. The inventive concept is designed to present guidelines designed from the story vector by which the at least one or more of audience members, characters, actors, clients, moderators, and other constituencies create and consume story content. For illustration, a guideline may permit a story participant to negotiate to a limited level of value.

The inventive concept, including a corresponding method for using the disclosed system, now will be described more fully hereinafter with reference to the accompanying drawings, which are intended to be read in conjunction with both this summary, the detailed description, and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

DETAILED DESCRIPTION OF THE INVENTION

Following are more detailed descriptions of various interconnected related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1:
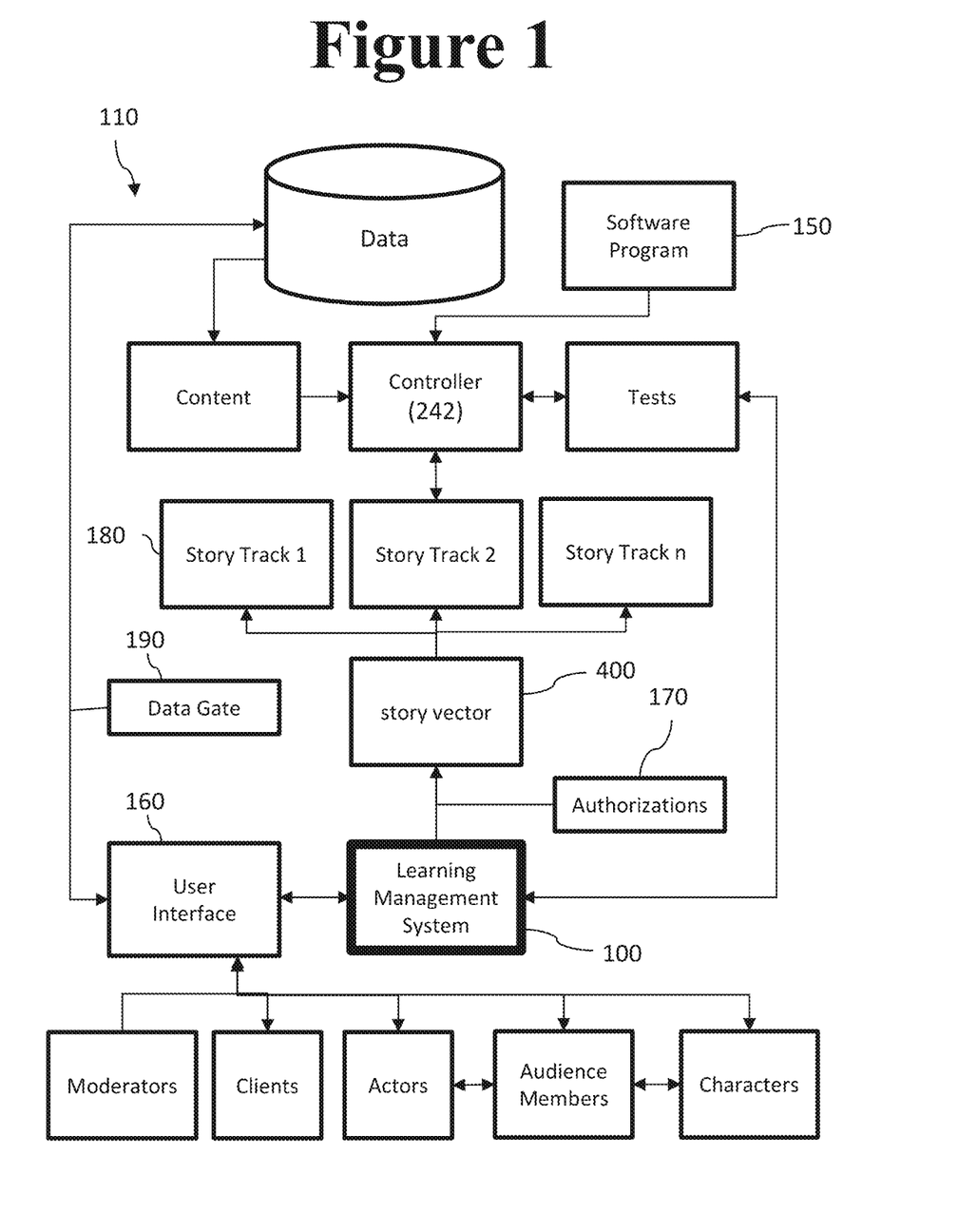
FIG. 1 illustrates a representative Learning Management System.

FIG. 1 illustrates a representative Learning Management System 100 designed to facilitate a Live, Real-Time Interactive Learning Entertainment platform to create, maintain, develop and alter a live and interactive learning entertainment experience, wherein audience-member participants, in coordination with a moderator participant (the moderator participant which may be automated) participate, along with other participant constituencies—actors, clients, producing logistics, characters as originally created by the original author and as perceived by participants, characters portrayed by actors, writers, directors, producers, designers, educator-researchers, members of the public, IT personnel, learning content creators—in an ongoing, evolving, deepening observation and contemplation of, dialogue with, coaching, re-coaching, creation and implementation of new, alternative and transformative character behaviors, values and beliefs, creation and implementation of new, alternative and transformative story element options, role-playing with actors portraying characters in one or more scenes of dramatic creative content leading people towards the goal of the audience-member participants, actor participants, moderator participants and other participant constituencies manifesting greater awareness of themselves, others, the world, and the universe. Audience members may also be participants within a story or as outside people influencing how a story progresses.

FIG. 1 illustrates that representative Learning Management System 100 is designed to facilitate the live, interactive, evolving, unrehearsed, and unscripted alterations to the initial expression, levels, qualities and identifiers of story forms, including characters and plot dynamics within a story, plus the catalytic changes and transformation of awareness and input within, between, and among audience members, actors, actors portraying characters, moderators, and other interactive storytelling participant constituencies. While people involved in Live, Real-Time Interactive Learning Entertainment may be given many names, in the representative embodiment, we discuss the Live, Real-Time Interactive Learning Entertainment in terms of clients, actors, audience members, characters portrayed by actors, characters as originally created by the original author and as perceived by participants, and moderators, noting further that these participants may also be augmented by the presence and creative contributions of other participant constituencies—directors, producers, designers, writers, educator-researchers, learning content creators, IT, members of the public, producing logistics. Furthermore, the participant constituencies may also include the presence and contributions of legal, financial, marketing/promotion personnel (and other such classifications of participant constituencies).

Figure 3:
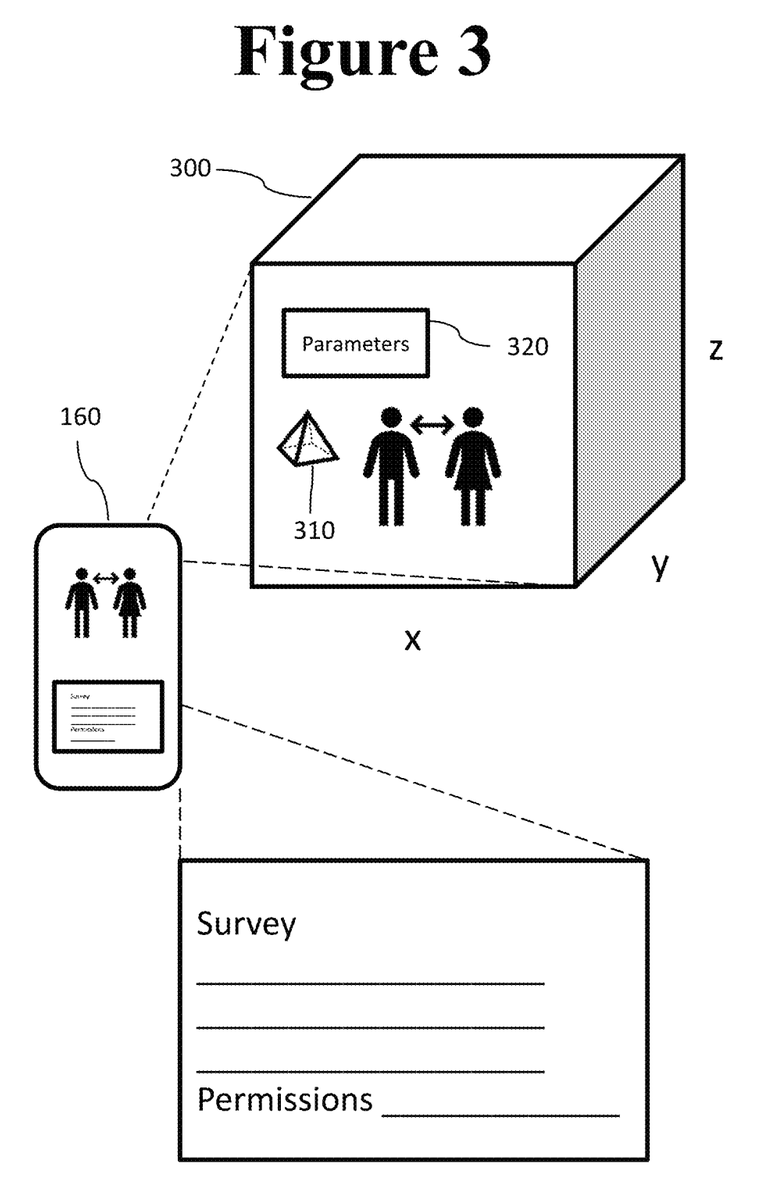
FIG. 3 illustrates a representative story space with a representative Learning Management System interface.
Figure 4:
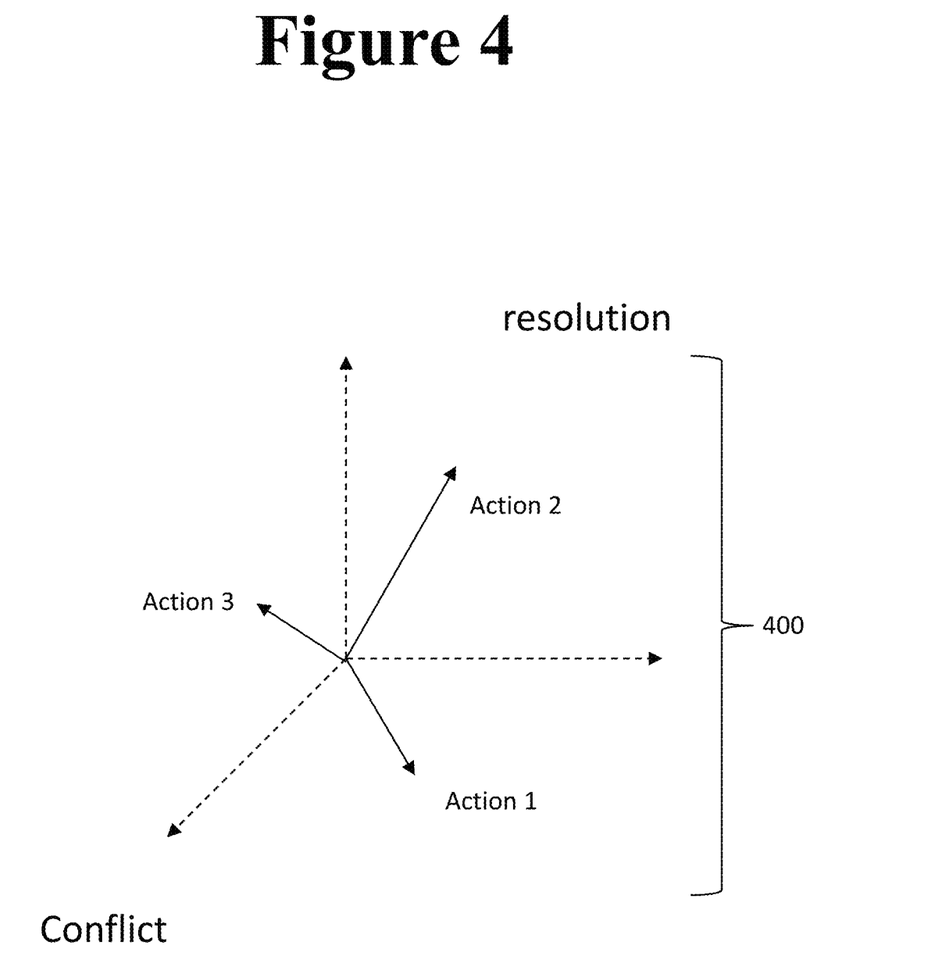
FIG. 4 illustrates a representative story vector.

FIG. 1 illustrates that representative Learning Management System 100 includes a system for interactive learning having a content database 110, the content including spatial, temporal, material, psychological, moral, artistic, philosophical, scientific, and probability elements from which to create a story track 180. These elements include, illustrated in FIG. 3, a physical environment 300 in which a story takes place, objects within the physical environments 310, and psychological and moral parameters 320 from which a story takes place. A parameter is a numerical or other measurable factor forming one of a set that defines a system or sets the conditions of its operation. For example, a choice that takes a story in one direction may receive a positive score because it aids a person or a negative score because it hurts a person. Such a number might be recorded with another number that represents the type of aid provided, for example, one number for moral support and another number for physical support. Parameters and elements are measurable and can be parsed to the level of detail that makes sense. For example, the space that represents a room can be measured in three-dimensional space. A fourth variable may be used to track that space over time. Psychological characteristics can be measured using psychological tests, assessments, and evaluations of past actions (or inactions). Psychological characteristics can be measured using psychological tests and evaluations of past actions. These elements allow a software algorithm to treat such measurements as a score from which to define people, places, and things incorporated into a story. A score may be presented as at least one or more of a single number, a series of numbers, and a matrix of numbers that would be termed in the art as a vector. Vectors, which determine a coordinate and a direction, have limitless potential positions, directions, and magnitudes. Vectors, which determine a coordinate and a direction, have limitless potential positions, directions, and magnitudes. Some vectors, however, are story vectors 400, which define how given stories and their elements, including traditional and alternative narrative forms and models, are modified.

Figure 2:
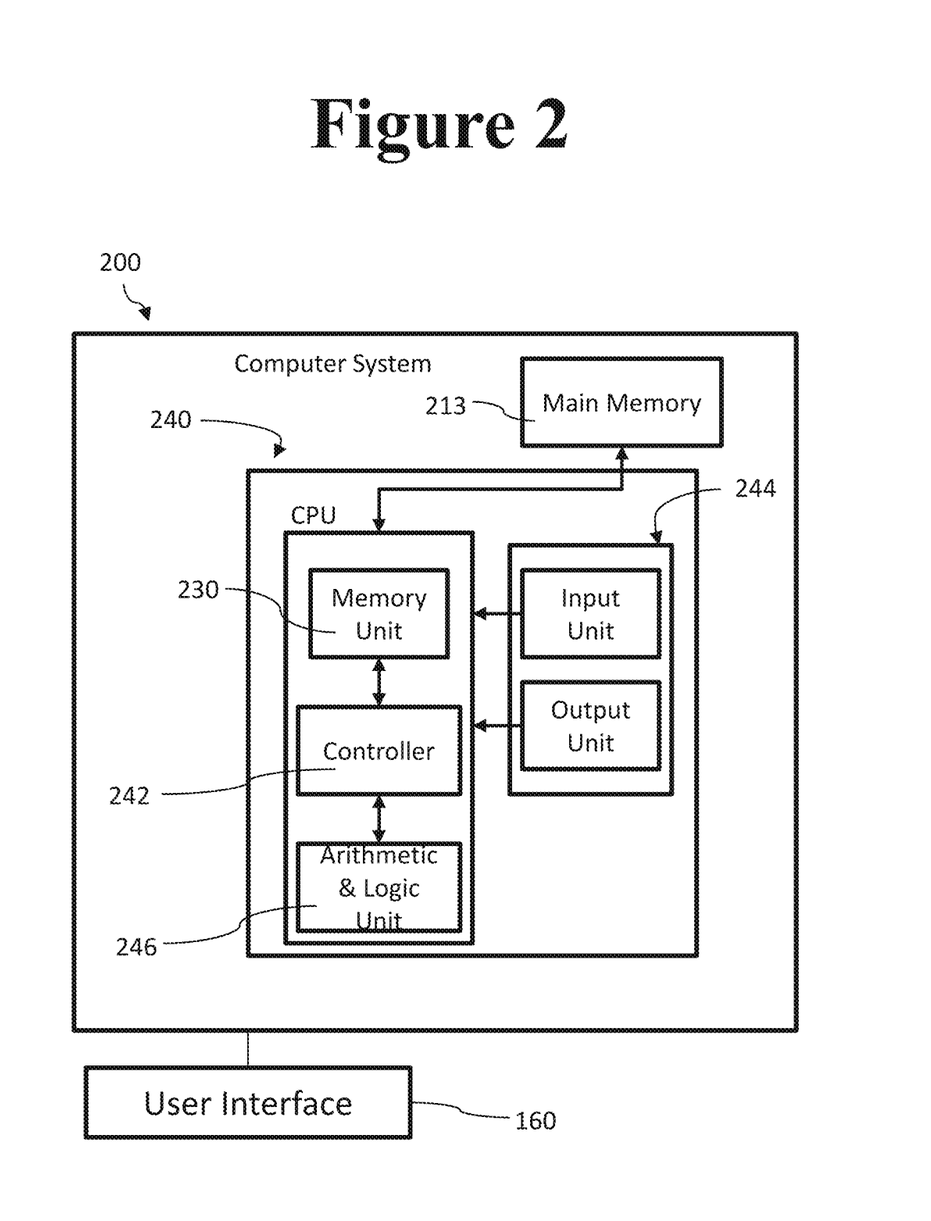
FIG. 2 illustrates a representative computer system.

FIG. 2 illustrates that representative Learning Management System 100 includes at least one software program 150 disposed on at least one computer system 200 and controller 242 designed to create vectors from which to craft a story and a learning objective. The computer system 200 includes a central processing unit (CPU) 240, also called a central processor or main processor, which is the electronic circuitry within the computer 200 that executes instructions that make up a computer program. The CPU 240 performs basic arithmetic, logic, controlling, and input/output (I/O) operations specified by the instructions in the program. An arithmetic logic unit (ALU) 246 is a combination digital electronic circuit that performs arithmetic and bitwise operations in integer binary numbers. Traditionally, the term CPU 240 refers to a processor, more specifically to its processing unit and controller (CU) 242, distinguishing these core elements of a computer from external components such as main memory 213 and input output (I/O) circuitry 244. A CPU 240 may also contain memory 230. Memory 230 refers to a component that is used to store information for immediate use in a computer 200.

Figure 5:
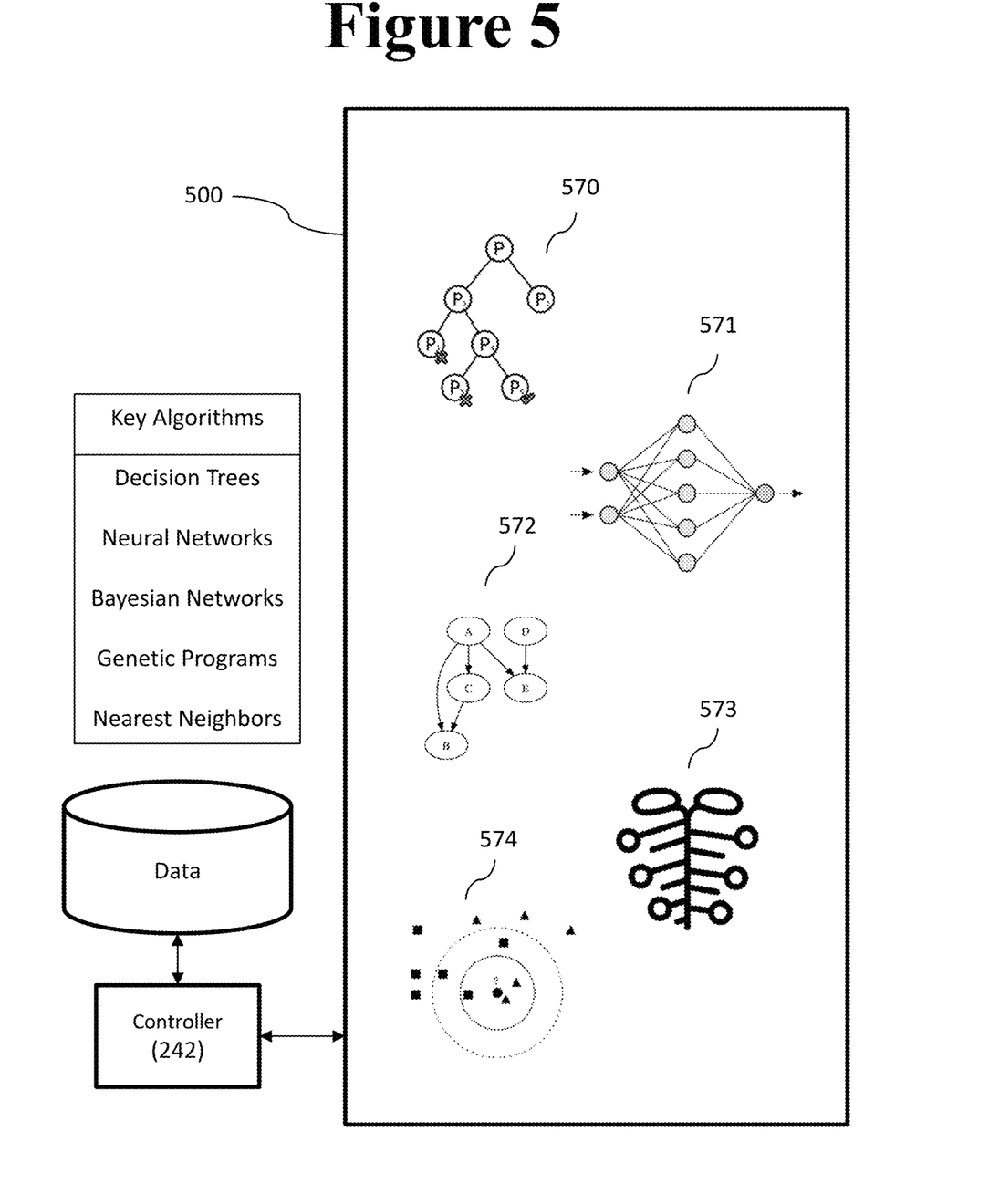
FIG. 5 illustrates machine learning options.

FIG. 4 illustrates a representative vector. A vector is a quantity usable by the computer system 200 having direction as well as magnitude, especially as determining the position of one point in space relative to another. Space can be literal, such as a place in a room and figurative such as where one concept is in relation to another based on defined characteristics. For example, a bottle of soda would have vector characteristics likely to be more like another soda than a beverage such as chocolate milk. Some vectors, such as the space in a room or a personality characteristic, may be constants. Other vectors, such as the share of an object received from a negotiation or the perception of whether an act is moral, may be variable. Variable vectors further allow the software program 150 to determine the direction of the story and how well story elements are aligned. Vectors may further be used in machine learning systems 500, including those that may be designed to create story tracks 180 without human intervention. For illustration, a common way to measure personality is an existing test called Myers-Brigg Type Indicator (MBTI) from which a four-variable vector may be created from the degree of extraversion versus introversion, sensing versus intuition, thinking versus feeling, and judging verses perceiving, wherein the degree to which vectors of actors run parallel reflect the similarity in personalities and, therefore, how conflicts are likely best resolved. For further illustration, a character may watch or participate in a learning knowledge exercise where his/her MBTI personality pattern may stay the same but a vector representing the personality of another character may change or may be called to change by at least one of the audience members, actors, characters portrayed by actors, clients, moderators, etc; the audience-member participant may range from an observer only to an active participant including role playing in the story—for illustration, a MBTI-learning role play.

For a second illustration, vectors may be created for how an underlying conflict is resolved. Such a vector might arise from a space using terms of greater self-awareness, greater social awareness, and greater self-management, each represented by the x, y, z axes, wherein solutions to problems and their vectors will lie within the solution space and can be compared to other solutions and recommended solutions. Multidimensional vectors may be used that must be represented in numerical, matrixed, space from which similarities and differences may be measure. Therefore, a range of similarities and differences may be determined from which to test learning and test the success and differences of story tracks 180. Cosine similarities are one example calculation that may be used to describe vector similarities and differences. For example, an action proposed by a participant to Character #1 may—within a story conflict concerning divorce—deliver a financial benefit to Character #2 but may come commiserate with a loss in freedom of visitation parameters, vectors representing the dollar value and the freedom of visitation parameters changing correspondingly. How people may react to differences could, for example, be determined on a vector measurement of wealth and, therefore, the value placed on the dollar compared to time.

FIGS. 1-4 illustrate that the Learning Management System 100 includes at least one user interface designed to at least one or more of present the story, present test questions pertaining to the story, and allow at least one or more people to, via at least one or more of video, audio, and text, interact with at least one or more of the software program 150 and people, the people including at least one or more of audience members, characters, actors, clients, moderators, and other constituencies, the actors which are at least one or more of people or computer-generated avatars. The Learning Management System 100 is designed to receive inputs and present outputs and may be designed to use calculations made at least one or more of on the Learning Management System 100 and a Learning Management System controller and memory therein, the learning management system interface 160 with a controller and memory which may be the learning management system controller and memory of a smartphone or other handheld device.

Common story patterns may be used to frame story vectors 400. For example, a project may be programmed to follow the track of the hero's journey where a character decides whether to leave his ordinary world to pursue an extraordinary work project whereupon the computer, possibly with audience member input, may run an escalating series of challenges until the character succeeds or fails.

FIGS. 1-4 illustrate that the Learning Management System 100 includes the Live, Real-Time Interactive Learning Entertainment platform is designed to facilitate interactivity for ongoing, deepening, and evolving input from audience members and other participant constituencies—unscripted and unrehearsed input which is spontaneously implemented by authorized people which can alter various given story elements scripted in the original story. Thus, in representative embodiments, audience members, actors, characters played by actors, moderators, and other participant constituencies are in fact authentic creative contributors to a process of mutation and re-representation of artistic and learning knowledge content.

FIGS. 1-4 illustrate that the Learning Management System 100 includes at least one authorization gate 170 designed to regulate which at least one person can direct at least one parameter of the story in real-time, the software program 150 designed to direct the story within degrees of freedom calculated from the story vectors 400 to create new story vectors 400 denoting a new path, the story vectors 400 used to create one or more story tracks 180. The authorization gate 170 allows the at least one person to change parameters of a given story and may restrict other people from changing like parameters. For illustration, the authorization gate 170 at one point in time may allow only a moderator to change parameter of the story and corresponding story vectors 400. At another point in time, the authorization gate 170 may allow participants to change the story vectors 400. Allow, as used here, is synonymous with authorize. The inventive concept is designed to present guidelines designed from the story vector 400 by which the at least one or more of audience members, characters, actors, clients, moderators, and other constituencies at least one or more of create and consume story content. For illustration, a guideline may allow a story participant to negotiate to a limited level of value. Guidelines, for another illustration, may further create realistic outcomes where characters do not skew a learning outcome by taking actions unlikely to be taken in real life, such as betting every penny owned on a low-probability result.

FIGS. 1-4 illustrate that the representative Learning Management System 100 includes at least one data gate 190 designed to regulate which at least one person can access data collected from participants. The data gate 190 can be used to protect confidentiality, for example, preventing access to test data that interactive storytelling participants were promised would remain confidential.

FIGS. 1-4 illustrate that the Learning Management System 100 is designed to calculate vectors in real time and present results back to audience members, characters, actors, clients, moderators, and other participant constituencies. The vectors have at least two components, a direction and a length representing some quality such as speed or the degree to which a participant scored, for example, as an introvert or an extrovert.

FIGS. 1-4 illustrate that the Learning Management System 100 is further designed to employ story structures from which to calculate story vectors. For example, and as noted, a well-known story structure is the hero's journey that includes, but is not limited to, existence in an ordinary world, a call to adventure, a series of trials, self-reflection, a final contest, and finding an elixir, and such may be modeled to such activities as project management, work, home, family community, where, because the hero's journey stems from the human condition, similar elements may be experienced by audience member, for instance as they move from accepting a project and associated challenges to reaching a conclusion of the project. As another example, the commonly used prophet story line where a person is persecuted for who they are may be modelled to help train a person, including audience members, characters, actors, clients, moderators, and other constituencies, to leverage their talents without becoming a pariah. Story vectors 400 may be modelled based on whether actions are likely to create a resolution or some degree toward the opposite.

FIG. 5 illustrates that the Learning Management System 100 may calculate story vectors 400 via machine learning software systems from a group of: decision trees 570, neural networks 571, Bayesian networks 572, genetic programs 573, and nearest neighbor 574. The performance tracking system and the one or more activity recommendation systems are operationally coupled with reference to FIG. 5, to at least one or more computer systems 500 having a computer processing unit 240 and a memory storage medium 213.

Figure 6A:
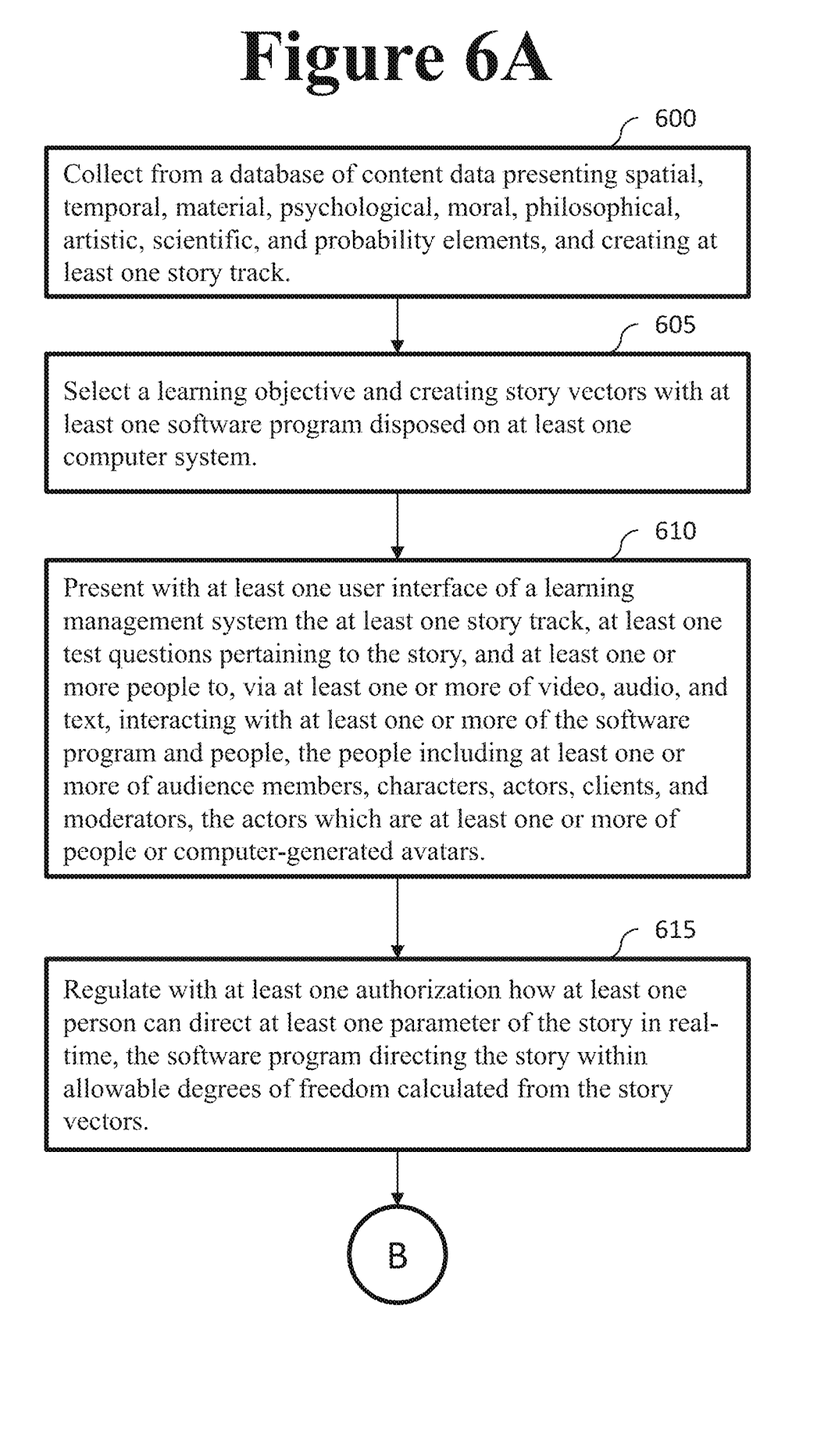
FIG. 6A-6C illustrates a representative method for interactive learning.
Figure 6B:
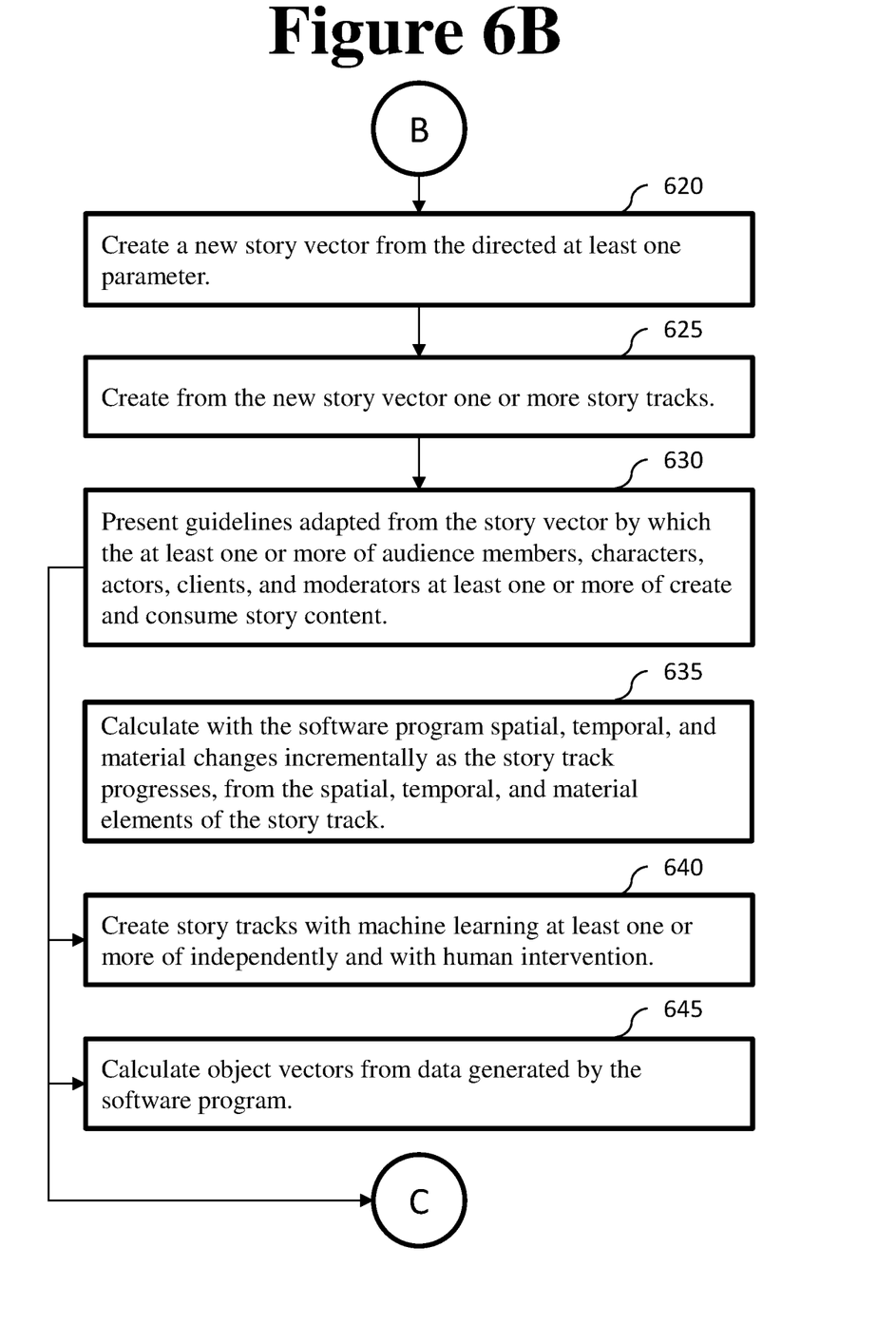
Figure 6C:
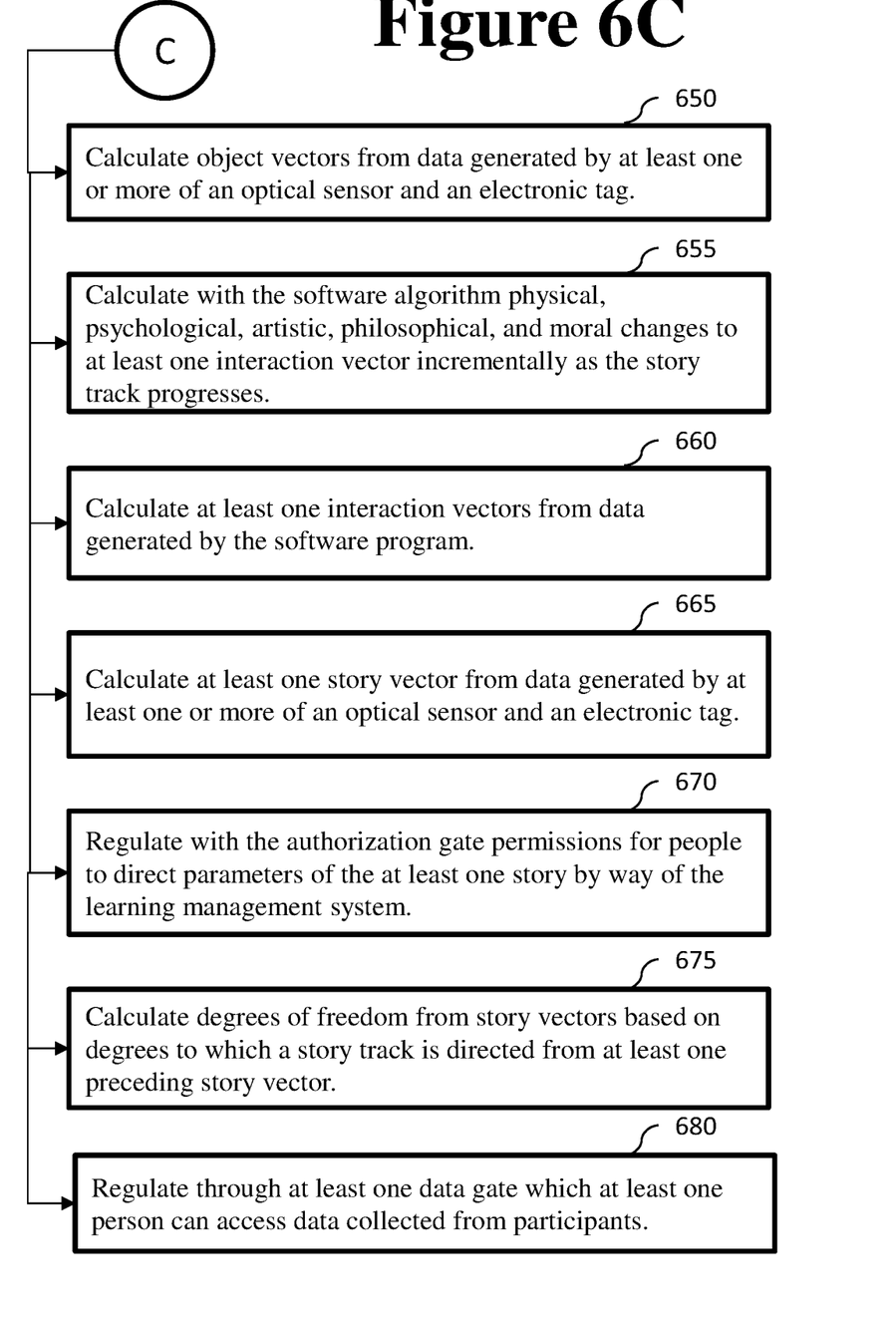

FIG. 6A-6C illustrates a method for interactive learning, the method including collecting from a content database 110 with content presenting spatial, temporal, material, psychological, moral, artistic, philosophical, scientific, and probability elements, and creating at least one story track 180. The method further includes the step of 605, selecting a learning objective and creating story vectors with at least one software program 150 disposed on at least one computer system and select a learning objective. The method further includes the step of 610, presenting with at least one user interface 160 of a Learning Management System 100 the at least one story track 180, at least one test questions pertaining to the story, and at least one or more people to, via at least one or more of video, audio, and text, interacting with at least one or more of the software program 150 and people, the people including at least one or more of audience members, characters, actors, clients, moderators, and other participant constituencies, the actors which are at least one or more of people or computer-generated avatars.

FIG. 6A-6C further illustrate that the method for interactive learning includes the step of 615, regulating with at least one authorization how at least one person can direct at least one parameter of the story in real-time, the software program 150 directing the story within allowable degrees of freedom calculated from the story vectors. The method further includes the step of 620, creating a new story vector 400 from the directed at least one parameter. The method further includes the step of 625, creating from the new story vector 400 one or more story tracks 180. The method further includes the step of 630, presenting guidelines designed from the story vector 400 by which the at least one or more of audience members, characters, actors, clients, moderators, and other participant constituencies, at least one or more of create and consume story content.

FIG. 6A-6C further illustrate that the method for interactive learning may include the step of 635, calculating with the software program 150 spatial, temporal, and material changes incrementally as the story track 180 progresses, from the spatial, temporal, and material elements of the story track 180.

FIG. 6A-6C further illustrates that the method for interactive learning may include the step of 640 creating story tracks with machine learning at least one or more of independently and with human intervention.

FIG. 6A-6C further illustrate that the method for interactive learning may include the step of 645, calculating object vectors from data generated by the software program 150.

FIG. 6A-6C further illustrate that the method for interactive learning may include the step of 650, calculating object vectors from data generated by at least one or more of an optical sensor and an electronic tag.

FIG. 6A-6C further illustrate that the method for interactive learning may include the step of 655, calculating with the software algorithm physical, psychological, artistic, philosophical, and moral changes to at least one interaction vector incrementally as the story track 180 progresses.

FIG. 6A-6C further illustrate that the method for interactive learning may include the step of 660, calculating at least one interaction vectors from data generated by the software program 150.

FIG. 6A-6C further illustrate that the method for interactive learning may include the step of 665, calculating at least one story vector from data generated by at least one or more of an optical sensor and an electronic tag.

FIG. 6A-6C further illustrate that the method for interactive learning may include the step of 670, regulating with the authorization gate 170 permissions for people to direct parameters of the at least one story by way of the Learning Management System 100.

FIG. 6A-6C further illustrate that the method for interactive learning may include the step of 675, calculating degrees of freedom from story vectors 400 based on degrees to which a story track 180 is directed from at least one preceding story vector 400.

FIG. 6A-6C further illustrate that the method for interactive learning may include the step of 680, regulating through at least one data gate 190 which at least one person can access data collected from participants.

Events supported by the Learning Management System 100 may occur in a real-time/live setting; and may occur before a live audience(s); performance(s) are recorded and archived—including improvised and unscripted portions of Interactive Learning Entertainment Event performance(s) which can and may be generated by interactions within, between and among participants. Within the experience, creative learning content can utilize any narrative form and model, including traditional & alternative story forms and models. As such, each, and all, story forms and models elements can and may have significant values of expression, meaning, impact and application.

The following patents are incorporated by reference in their entireties: Pat. Nos. U.S. Pat. Nos. 5,930,473A, 9,060, 099B2, 9,679,495B2, and U.S. Ser. No. 10/198,962B2

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A system for interactive learning comprising:
    A database of content, the content including spatial, temporal, material, psychological, moral, artistic, philosophical, scientific, and probability elements from which to create a story track using at least one story pattern and compared value;
    at least one software program disposed on at least one computer system adapted to calculate story vectors from which to craft a story based on a learning objective, the system including at least one interaction vector determining the action of a story track, the software algorithm adapted to calculate physical, psychological, artistic, philosophical, and moral changes incrementally as the story track progresses; machine learning adapted to create story tracks;
    a learning management system with at least one user interface adapted to at least one or more of present the story, present test questions pertaining to the story, and allow at least one or more people using story structures to, via at least one or more of video, audio, and text, interact with at least one or more of the software program and people, the people including at least one or more of audience members, characters, actors, clients, and moderators, the actors which are at least one or more of people or computer-generated avatars;
    the learning management system adapted to receive inputs and present outputs and adapted to use calculations made at least one or more of on the learning management system, a learning management system controller and memory therein, the learning management system controller and memory which may be the learning management system controller and memory of which may be at least one or more of a smartphone, other handheld devices, and a personal computer;
    at least one authorization gate adapted to regulate which at least one person can direct, by way of the user interface, at least one parameter of the story in real-time, the software program adapted to direct the story within degrees of freedom calculated from the story vectors to create new story vectors, the story vectors used to create one or more story tracks;
    wherein the learning management system presents to people, by way of the at least one user interface, permissions to direct parameters of the at least one story track as regulated by the authorization gate; and
    presenting guidelines adapted from the story vector by which the at least one or more of audience members, characters, actors, clients, and moderators at least one or more of create and consume story content.

2. The system for interactive learning of claim 1, the system including at least one spatial and at least one object vector determining the spatial, temporal, and material element of the story track, the software algorithm adapted to calculate spatial, temporal, and material changes incrementally as the story track progresses.

3. The system for interactive learning of claim 2, wherein the object vectors are calculated from data generated by the software program.

4. The system for interactive learning of claim 2, wherein the object vectors are calculated from data generated by at least one or more of optical sensors and an electronic tag.

5. The system for interactive learning of claim 1, wherein at least one story vector is calculated from data generated by the software program.

6. The system for interactive learning of claim 1, wherein at least one story vector is calculated from data generated by at least one or more of an optical sensor and an electronic tag.

7. The system for interactive learning of claim 1, wherein degrees of freedom calculated from story vectors are based on degrees to which a story track is directed from a previous story vector.

8. The system for interactive learning of claim 1, wherein at least one data gate is adapted to regulate which at least one person can access data collected from participants.

9. A method for interactive learning, the method including:
- collecting from a database of content data presenting spatial, temporal, material, psychological, moral, artistic, philosophical, scientific, and probability elements, and creating at least one story track using at least one story pattern and compared value;
- selecting a learning objective and creating story vectors with at least one software program disposed on at least one computer system, including the system selecting at least one corresponding interaction vector determining the action of a story track, the software algorithm calculating physical, psychological, artistic, philosophical, and moral changes incrementally as the story track progresses; machine learning creating story tracks;
- presenting with at least one user interface of a learning management system the at least one story track, at least one test question pertaining to the story, and at least one or more people using story structures to, via at least one or more of video, audio, and text, interacting with at least one or more of the software program and people, the people including at least one or more of audience members, characters, actors, clients, and moderators, the actors which are at least one or more of people or computer-generated avatars;
- regulating with at least one authorization gate how at least one person can direct at least one parameter of the story in real-time, the software program directing the story within allowable degrees of freedom calculated from the story vectors;
- creating a new story vector from the directed at least one parameter;
- creating from the new story vector one or more story tracks;
- presenting to people by way of the at least one user interface of the learning management system permissions to direct parameters of the at least one story track as regulated by at least one authorization gate; and
- presenting guidelines adapted from the story vector by which the at least one or more of audience members, characters, actors, clients, and moderators at least one or more of create and consume story content.

10. The method for interactive learning of claim 9, the method including calculating with the software program spatial, temporal, and material changes incrementally as the story track progresses, from the spatial, temporal, and material elements of the story track.

11. The method for interactive learning of claim 9, the method including calculating object vectors from data generated by the software program.

12. The method for interactive learning of claim 9, the method including calculating object vectors from data generated by at least one or more of an optical sensor and an electronic tag.

13. The method for interactive learning of claim 9, the method including calculating at least one story vector from data generated by the software program.

14. The method for interactive learning of claim 13, the method including calculating at least one story vector from data generated by at least one or more of an optical sensor and an electronic tag.

15. The method for interactive learning of claim 9, the method including regulating with the authorization gate permissions for people to direct parameters of the at least one story by way of the at least one user interface of the learning management system.

16. The method for interactive learning of claim 9, the method including calculating degrees of freedom from story vectors based on degrees to which a story track is directed from at least one preceding story vector.

17. The method for interactive learning of claim 9, the method including regulating through at least one data gate which at least one person can access data collected from participants.

* * * * *